United States Patent [19]
Marder et al.

[11] Patent Number: 5,475,549
[45] Date of Patent: Dec. 12, 1995

[54] MAGNESIUM-BERYLLIUM DISK DRIVE ARMSET

[75] Inventors: James M. Marder, Shaker Heights; Warren J. Haws, Cleveland, both of Ohio

[73] Assignee: Brush Wellman Inc., Cleveland, Ohio

[21] Appl. No.: 459,290

[22] Filed: Jun. 2, 1995

Related U.S. Application Data

[63] Continuation of Ser. No. 185,115, Jan. 21, 1994, abandoned.

[51] Int. Cl.⁶ .......................... G11B 21/16; G11B 21/08
[52] U.S. Cl. .......................... 360/104; 360/106; 369/244; 369/222
[58] Field of Search ...................... 360/104, 106, 360/105, 97.01, 98.01; 369/215, 219, 222, 244

[56] References Cited

U.S. PATENT DOCUMENTS

| | | | |
|---|---|---|---|
| 4,710,834 | 12/1987 | Brand et al. | 360/105 |
| 4,774,610 | 9/1988 | Kinjo | 360/104 |
| 4,814,908 | 3/1989 | Schmitz | 360/77.02 |
| 4,860,135 | 8/1989 | Cain | 360/97.02 |
| 4,941,062 | 7/1990 | Yoshioka | 360/106 |
| 4,949,194 | 8/1990 | MacPherson et al. | 360/104 |
| 5,041,934 | 8/1991 | Stefansky | 360/106 |
| 5,130,871 | 7/1992 | Whitmore | 360/104 |
| 5,161,077 | 11/1992 | Jabbari | 360/106 |
| 5,202,804 | 4/1993 | Takekado | 360/106 |
| 5,251,085 | 10/1993 | Morris et al. | 360/106 |
| 5,260,847 | 11/1993 | Bashere et al. | 360/106 |
| 5,268,805 | 12/1993 | Peng et al. | 360/106 |

FOREIGN PATENT DOCUMENTS

| | | | |
|---|---|---|---|
| WO93/08563 | 4/1993 | WIPO | 360/106 |

OTHER PUBLICATIONS

JP-A-53-082-302 (Abstrat), Pioneer Electronic Corporation, WPI/Derwent, Jul. 1978.

*Primary Examiner*—Robert S. Tupper
*Assistant Examiner*—Craig A. Renner
*Attorney, Agent, or Firm*—Hopgood, Calimafde

[57] ABSTRACT

An actuator armset for a computer disk drive, in accordance with one aspect of the present invention, is comprised of a magnesium alloy containing beryllium. The armset has a bore for rotating about a spindle of the disk drive to position a transducer radially across a disk of the disk drive. In accordance with another aspect of the invention is an actuator armset of a disk drive system for movably positioning and supporting a transducer over a disk of the disk drive. The armset has a bore for pivoting about a spindle and comprises a magnesium alloy containing beryllium. A bearing assembly is interposed between the armset and the spindle, a flexible suspension being mounted at one end of the armset. Mounted to an opposing end of the suspension is a transducer. A voice coil is, in turn, mounted to a set of armset brackets such that the voice coil and the brackets are opposite the suspension and transducer.

24 Claims, 4 Drawing Sheets

MAGNESIUM-BERYLLIUM DISK DRIVE ARMSET

This application is a continuation, of application Ser. No. 08/185,115, filed Jan. 21, 1994, now abandoned.

FIELD OF THE INVENTION

The present invention relates generally to articles made of stiff, light weight materials having low coefficients of thermal expansion and, more particularly, to articles made of magnesium alloys containing beryllium.

BACKGROUND OF THE INVENTION

Performance of electromechanical components such as those of computer disk drives has been found dependent substantially upon the properties of the component materials. For instance, to accurately pass data to and from the disk, it has been found necessary to precisely align transducers on the actuator armset with tracks on the disk. When the temperature of the disk drive rises, as is common during operation, the armset expands, interfering with the transfer of data to and from the disk. It is therefore desirable that the armset be constructed of materials having nominal coefficients of thermal expansion, i.e., which expand minimally when subjected to increasing temperatures.

To insure quick and precise armset movement using minimal power, it has also been found necessary to use light weight materials so that the forces of inertia exerted by the armset may be reduced. By using low weight (density) materials, the armset's moment of inertia is reduced, disk drive performance is improved, and power consumption minimized.

In addition, materials are desired which have both a high stiffness to mass ratio and high resonant frequency. This provides the armset with the strength to withstand the frequent sudden movements typically experienced during disk drive operation, while minimizing armset vibration and settling time.

Materials such as silicon carbide and aluminum-beryllium alloys have been found beneficial for their low thermal expansion, high stiffness and resonant frequency. Although useful, their relatively high density (weight) has made them less desirable. Beryllium and alloys of magnesium also have advantages, but none combine the benefits of high stiffness and resonant frequency with low weight, thermal expansion and cost.

SUMMARY OF THE INVENTION

In accordance with one aspect of the present invention, there is provided an actuator armset for a disk drive. The armset has a bore for rotating about a spindle of the disk drive to position a transducer radially across a disk of the disk drive. The armset is comprised of a magnesium alloy containing beryllium.

The present invention is further directed to an actuator armset of a disk drive system for movably positioning and supporting a transducer over a disk of the disk drive. The armset has a bore for pivoting about a spindle. A bearing assembly is interposed between the armset and the spindle, a flexible suspension being mounted at one end of the armset. Mounted to an opposing end of the suspension is a transducer. A voice coil is, in turn, mounted to armset brackets such that the voice coil and the brackets are opposite the suspension and transducer. The armset is comprised of a magnesium alloy containing beryllium.

Accordingly, it is an object of the present invention to provide an actuator armset combining the optimum characteristics of high stiffness and resonant frequency with low weight, thermal expansion, and cost.

It is another object of the present invention to provide an actuator armset which enhances disk drive performance.

The present invention will now be further described by reference to the following drawings which are not intended to limit the accompanying claims.

BRIEF DESCRIPTION OF THE DRAWINGS

The same numerals are used throughout the figure drawings to designate similar elements.

Still other objects and advantages of the present invention will become apparent from the following description of the preferred embodiments.

DETAILED DESCRIPTION OF THE PREFERRED EMBODIMENTS

FIGS. 1–6 illustrate generally a disk drive assembly 10 for a personal computer, in accordance with one aspect of the present invention. An objective of the assembly is to facilitate mass storage and retrieval of information on the disk drive.

Figure 1:
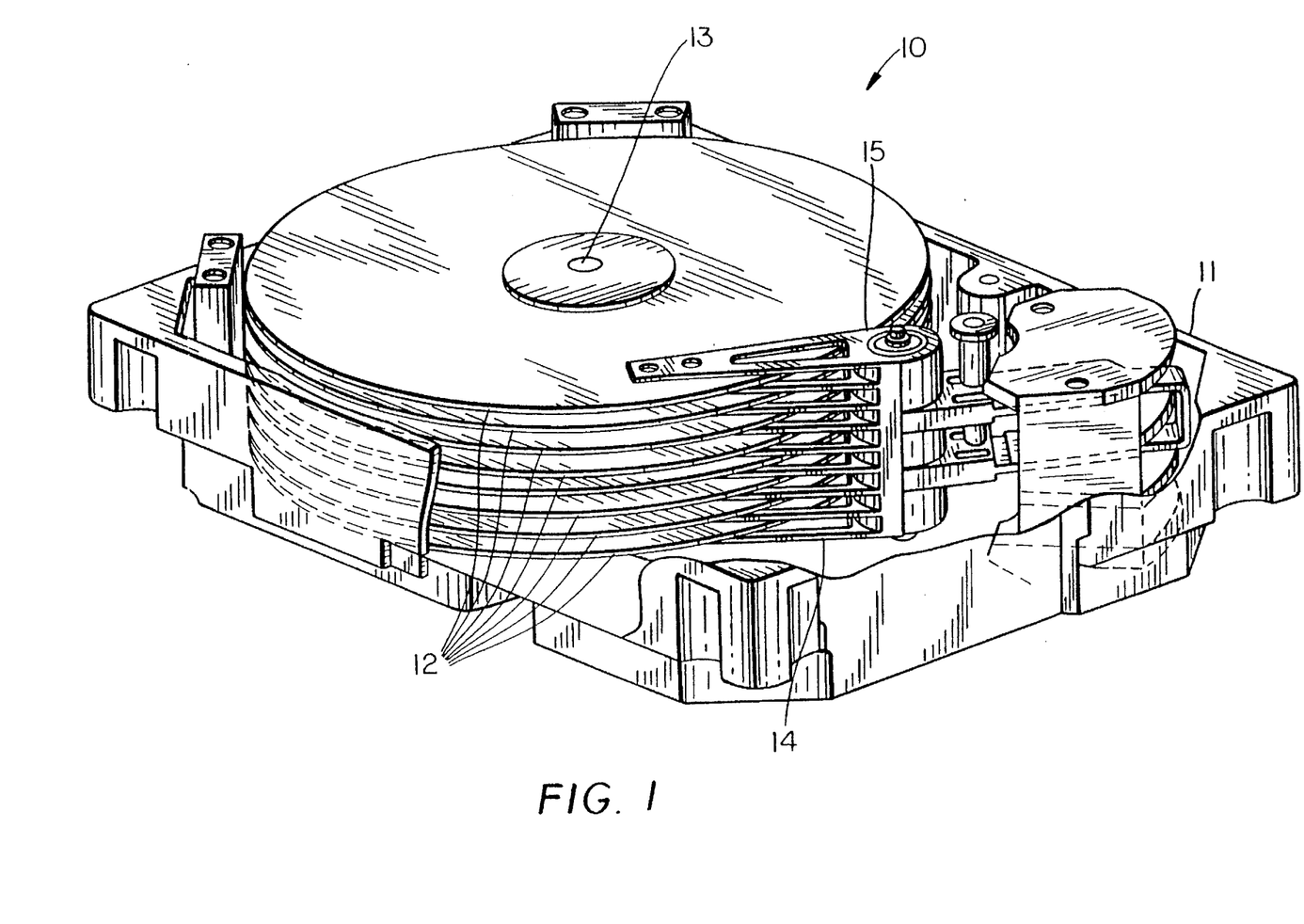
FIG. 1 is a perspective view of a disk drive assembly in accordance with one aspect of the present invention.
Figure 2:
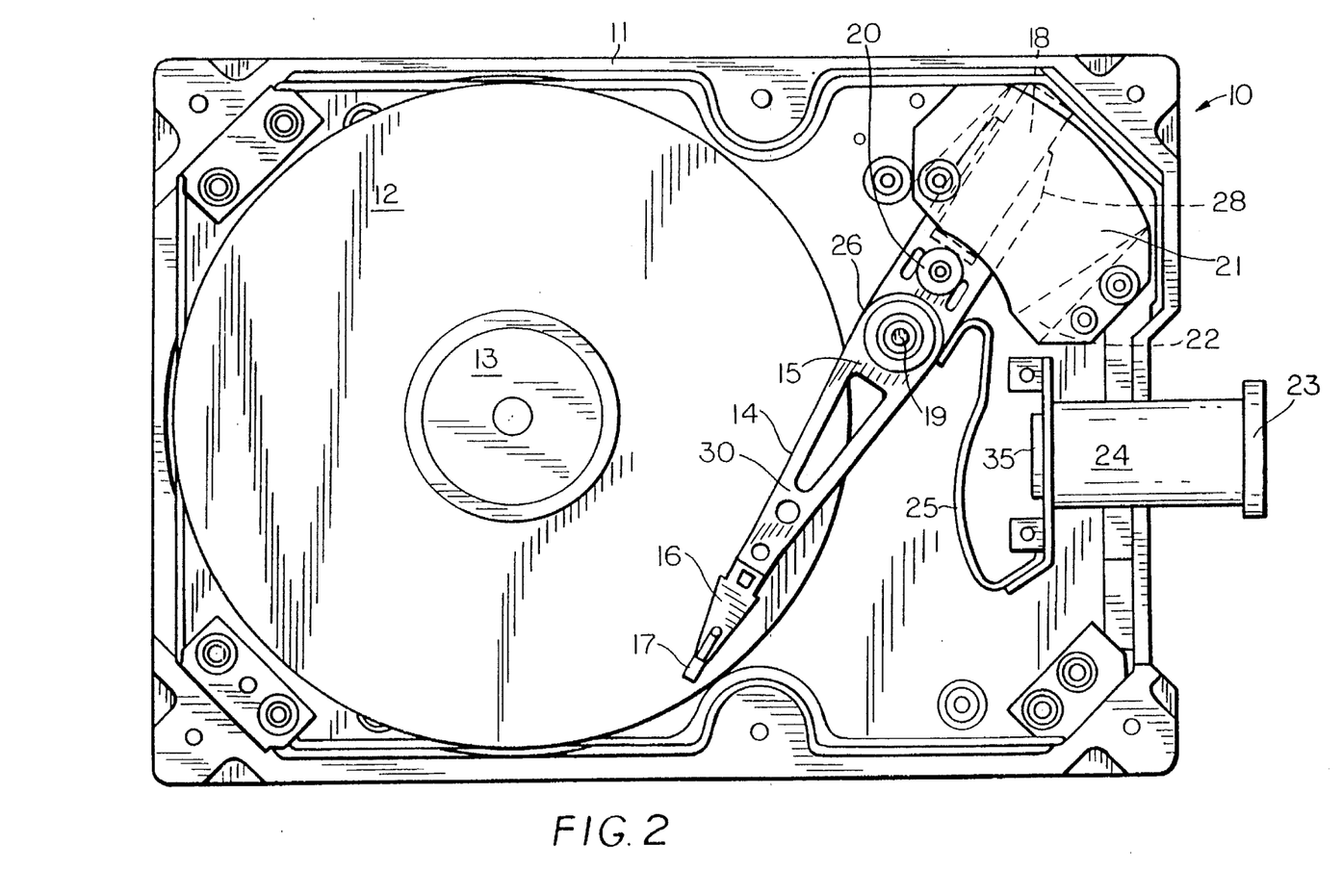
FIG. 2 is a plan view of the disk drive assembly of FIG. 1.

Disk drive assembly 10 is electronically coupled to the computer and includes a housing 11 for a plurality of stacked magnetic hard disks 12. The disks are operatively mounted to a central hub 13 which, in turn, is coupled to an electronic motor. Upon activation of the motor, the central hub (and disks) are rotated at a selected speed, e.g., about 6300 rpm.

An array of magnetic tracks are arranged in concentric circles on the surface of each disk. Each track comprises a magnetic encoding of information such as digital data, code, operating system software, and/or servo tracking information for the disk drive assembly.

Each disk has a selected diameter, e.g., of about 3.5 inches, and stores information, e.g., about forty megabytes of digital information. Those skilled in the art will appreciate that larger (or smaller) diameters, storage capacities and speeds may be used within the spirit and scope of the present invention.

The disk drive assembly also has an actuator 14, as shown in FIG. 1, including an armset 15, a plurality of suspensions 16, a plurality of transducers 17, a voice coil 18, a bearing assembly 19, and crash stop 20.

The actuator rotates about a spindle located at the center of bearing assembly 19, the bearing assembly and the spindle preferably being constructed of stainless steel. A pair of magnets 21 within housing 22 interact with voice coil 18, rotating in response to the amplitude and polarity of current passing through the coil. In an alternative embodiment of the present invention, a stepper motor is used in place of the voice coil and magnets.

Using electronic control circuitry, the disk drive control: the actuator by sending current to voice coil 18 via connectors 23, 24 and flex connector 25. When power to the disk drive is shut off, a back emf signal is sent from the motor to the voice coil in order to "park" the actuator.

Armset 15 includes a body 26 that surrounds the bearing assembly. The body mounts brackets 28 and 29 which hold voice coil 18 and a plurality of arms 30 positioned above and below each hard disk 12.

Figure 6:
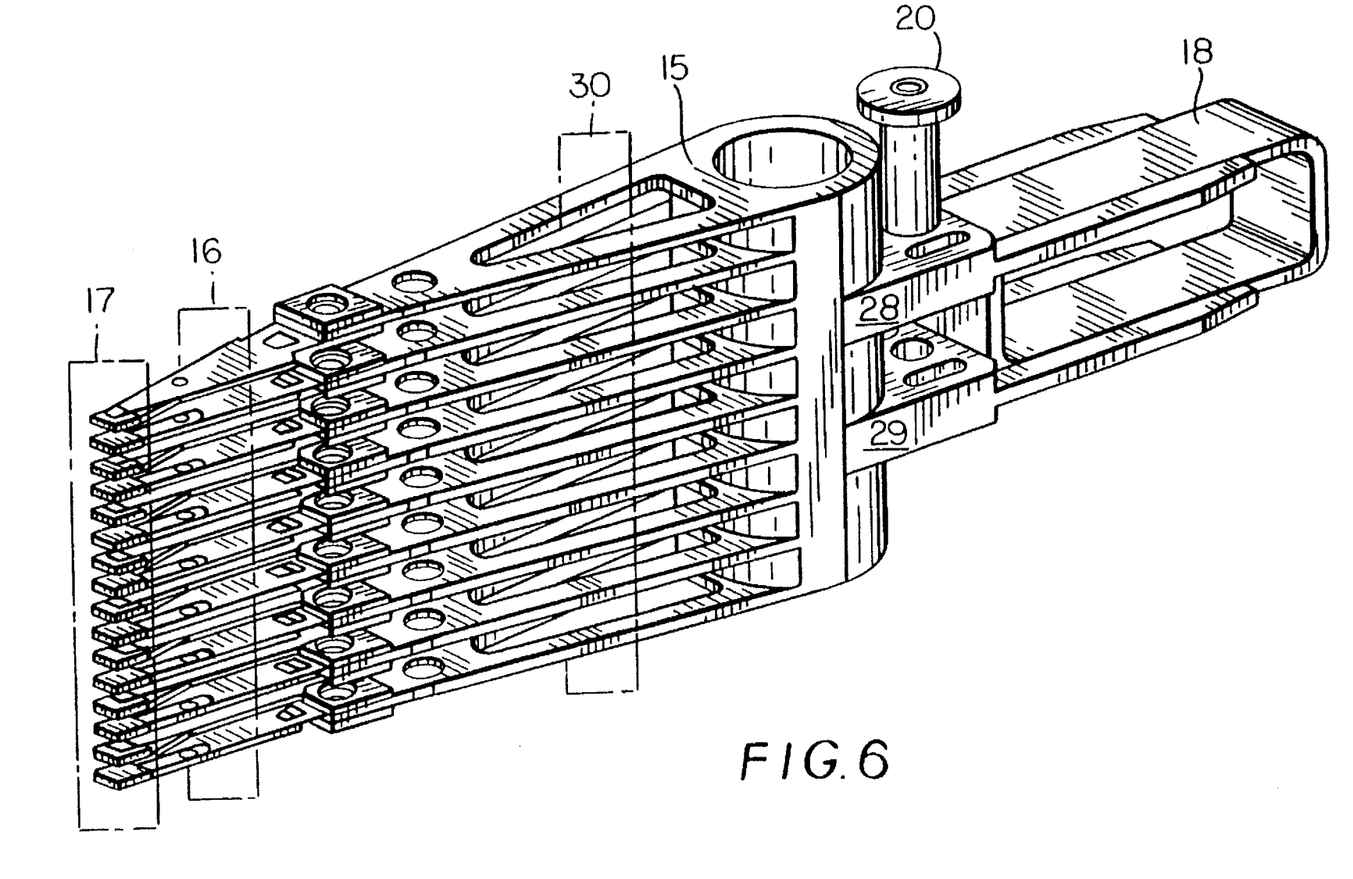
FIG. 6 is a perspective view of the armset of FIG. 3 with transducers, suspensions, a crash stop and voice coil.

A suspension or flexure 16, e.g., of stainless steel, is mounted at an end of each arm 30. Transducers 17 are each mounted to the opposite end of the suspensions, the suspensions giving the transducers a spring-like action. Typically, a plurality of arms 30, suspensions 16, and transducers 17 are located above and below the respective disks. Transducers are commonly referred to as heads, magnetic heads, or Winchester heads.

Transducers serve a variety of functions. They read information stored magnetically on the tracks of the disks. They convert that information into electrical signals that are sent by a flex connector or circuit 25 to a read/write data chip 35. They also send the signals from the disk drive to the host computer via flex connector or circuit 25 and connector 24. In addition, transducers are used to write information onto the tracks.

In operation, information to be written is sent by the host computer to read/write data chip 35 via connector 24 and flex circuit 25. The electrical signals from data chip 35 are then sent to the transducers by way of flex connector/circuit 25.

As the disks rotate, suspensions 16 allow the transducers to float above (and below) the disks. Rotation of the actuator causes transducers 17 to move across the disks from track to track, between points within the respective inner and outer disk diameters. This rotation of disks 12 and actuator 14 allows the transducers to access all of the information stored on each track.

It has been found relatively important that the armset be in static balance to keep the transducers 17 from straying from their tracks when subjected to shock or vibration. Given the relatively low weight of magnesium/beryllium alloys and the relatively thin profile of arms 30, neither armset 15 nor actuator 14 require a separately attached counterweight to achieve static balance.

Alternatively or concurrently therewith, disk drive 10 has a thermal compensation system. In another alternative embodiment, disk drive 10 is an optical disk drive. Optical disks are used in place of hard disks 12 and lasers are used instead of transducers 17. Also, circuitry 35 is replaced by circuitry for the optical drive, as will be understood by those skilled in the art.

Figure 3:
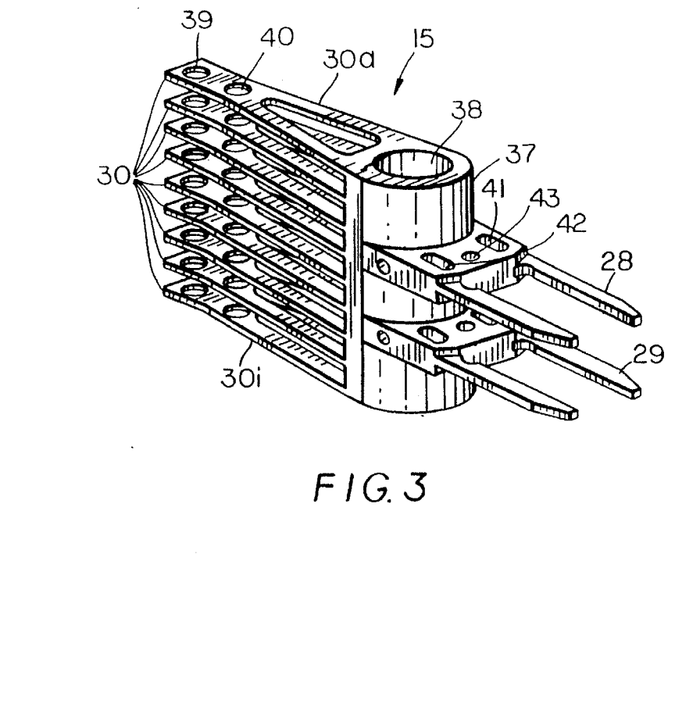
FIG. 3 is a perspective view of an actuator armset in accordance with one aspect of the present invention.

Referring now to FIG. 3, armset 15 is comprised of body 26 such as a swivel member 37, a plurality of arms 30, and brackets 28 and 29. Swivel member 37 is a vertical pipe-like structure that at one end mounts an end of each arm and at the other end mounts two sets of substantially U-shaped brackets 28 and 29.

A cylindrical hole 38 passes through and runs the length of the swivel member for receiving bearing assembly 19, as best seen in FIG. 2. The hole has a selected radius, e.g., about 0.3753 inches.

Where there is not a good match between the thermal expansion coefficient of the armset body and that of the shaft material, a steel sleeve is preferably placed in cylindrical hole 38 between armset body 26 and bearing assembly 19. Where there is a good match, no sleeve is generally needed, placing bearing assembly 19 in direct contact with swivel member 37 of the armset.

It is also preferred that armset 15 have nine arms 30 with eight disks 12 placed between the respective arm pairs. Top arm 30a and bottom arm 30i are each attached to a suspension and a transducer. The arms residing between arms 30a and 30i are also each coupled to a pair of suspensions and transducers. By this arrangement, there is a transducer both above and below each disk.

Each arm 30 has a selected thickness, e.g., about 0.0285 inches. They extend a selected distance, e.g., about 1.495 inches, from the center of hole 38 and are spaced apart, e.g., about 0.123 inches, in parallel to each other. Also, the distance from the top of arm 30a to the tip of brackets 28,29, for example, is about 2.835 inches. The height from the bottom of arm 30i to the top of arm 30a is about 1.013 inches.

Each arm 30 is also shaped generally in the form of an isosceles triangle. An isosceles triangular center portion is preferably cut from the arm to provide lateral stabilization with decreased weight. This portion has selected dimensions, e.g., of about 0.009 inches wide, and has holes 39, 40.

Hole 39 mounts one of the suspensions 16 for carrying a transducer. Hole 40 is a tooling hole which serves as a reference point during manufacture and reduces weight.

A pair of oval holes 41, 42 located in brackets 28, 29 further reduce armset weight. They also help to statically balance the armset and provide reference positions during serve writing. Another hole 43 is formed in brackets 28, 29 for mounting crash stop 20.

Voice coil 18 is attached to both brackets. The interaction between the voice coil and magnets 21 of the disk drive assembly causes the armset to rotate about an axis running generally through the center of cylindrical hole 38.

In an alternative embodiment of the present invention, armset 15 has eight or fewer arms 30. In another alternative embodiment, the armset has at least ten arms. In still another alternative embodiment, the armset has a single arm instead of the plurality of arms 30, and actuator 14 has a single suspension and transducer in place of the plurality of suspensions 16 and transducers 17.

In yet another alternative embodiment, actuator 14 has one set of brackets to hold the voice coil. In still another alternative embodiment, actuator 14 has a single bracket to hold the voice coil.

Preferably, armset 15 including the body, brackets, and arms is a one piece unit made entirely of a magnesium alloy containing beryllium (known as either magnesium/beryllium alloy or beryllium/magnesium alloy). It is preferred that the ratio of beryllium to magnesium be about 3-to-2, though it will be understood that larger (or smaller) ratios may be used, giving consideration to the purpose for which the present invention is intended. In accordance with one aspect of the present invention, the magnesium alloy containing beryllium includes a material structure consisting of a matrix of pure magnesium or one of a variety of magnesium based alloys and a dispersed phase made up of equi-axed particles of beryllium.

Alternatively or concurrently therewith, lesser amounts of aluminum and zinc are included in the alloy. AZ-91D/Be alloy, for example, contains, in the magnesium based portion of the alloy, 9% aluminum and 1% zinc, the balance magnesium. This is done to enhance the alloy's corrosion resistance and other properties, as demonstrated by Tables I and II below, and lower processing costs. Such alloys are also advantageous in being relatively free of deleterious intermetallic compounds.

TABLE I

Pure Mg/Be Alloy Property Comparison

| Be (Wt %) | Density (lb./in$^3$) | Modulus (MPSI) | E/Rho (in × 10$^6$) | CTE ((in/in)/°F. × 10$^{-6}$) |
|---|---|---|---|---|
| 0 | 0.063 | 6.4 | 102.0 | 14.0 |
| 5 | 0.063 | 8.2 | 129.9 | 13.6 |
| 10 | 0.063 | 10.0 | 157.8 | 13.3 |
| 15 | 0.063 | 11.8 | 185.7 | 12.9 |
| 20 | 0.063 | 13.6 | 213.5 | 12.6 |
| 25 | 0.064 | 15.4 | 241.4 | 12.2 |
| 30 | 0.064 | 17.2 | 269.3 | 11.8 |
| 35 | 0.064 | 19.0 | 297.2 | 11.4 |
| 40 | 0.064 | 20.9 | 325.1 | 11.1 |
| 45 | 0.064 | 22.8 | 353.0 | 10.7 |
| 50 | 0.065 | 24.6 | 380.8 | 10.3 |
| 62 | 0.065 | 29.2 | 447.7 | 9.4 |
| 70 | 0.065 | 32.2 | 492.4 | 8.8 |
| 80 | 0.066 | 36.1 | 548.1 | 8.0 |
| 90 | 0.066 | 40.0 | 603.9 | 7.2 |
| 100 | 0.067 | 44.0 | 659.7 | 6.4 |

TABLE II

AZ-91D/Be Alloy Property Comparison

| Be (Wt %) | Density (lb/in$^3$) | Modulus (MPSI) | E/Rho (in × 10$^6$) | CTE ((in/in)/°F. × 10$^{-6}$) |
|---|---|---|---|---|
| 0 | 0.065 | 6.5 | 99.6 | 14.5 |
| 5 | 0.065 | 8.3 | 127.6 | 14.1 |
| 10 | 0.065 | 10.2 | 155.6 | 13.7 |
| 15 | 0.065 | 12.0 | 183.6 | 13.3 |
| 20 | 0.066 | 13.9 | 211.6 | 12.9 |
| 25 | 0.066 | 15.7 | 239.6 | 12.5 |
| 30 | 0.066 | 17.6 | 267.6 | 12.1 |
| 35 | 0.066 | 19.4 | 295.6 | 11.7 |
| 40 | 0.066 | 21.3 | 323.6 | 11.3 |
| 45 | 0.066 | 23.2 | 351.6 | 10.9 |
| 50 | 0.066 | 25.0 | 379.6 | 10.5 |
| 62 | 0.066 | 29.6 | 446.8 | 9.5 |
| 70 | 0.066 | 32.6 | 491.6 | 8.9 |
| 80 | 0.066 | 36.4 | 547.6 | 8.5 |
| 90 | 0.067 | 40.2 | 603.9 | 7.2 |
| 100 | 0.067 | 44.0 | 659.7 | 6.4 |

Alloys of this type are described, for example, in copending U.S. patent application Ser. No. 08/184,867, which issued as U.S. Pat. No. 5,413,644 on May 9, 1993. filed on the same date herewith by James M. Marder and Warren J. Haws, entitled "Beryllium-Containing Alloys Of Magnesium", the disclosure of which is hereby incorporated by reference in its entirety.

Magnesium/beryllium alloys have been found particularly attractive for use in actuator armsets because of their unique combination of nonmagnetic properties, lightness, strength, high resonant frequencies, and relatively low coefficients of thermal expansion.

Nonmagnetic materials are desirable because of the close proximity of the armset to hard disks which magnetically store information. Use of a relatively nonmagnetic material such as a magnesium/beryllium alloy minimizes interference with magnetic recordings stored on the disks. Magnesium/beryllium alloys have also been found to lessen extraneous magnetic interference when writing and reading information to and from, respectively, the disks that might otherwise arise with a magnetic material.

The strength of magnesium/beryllium alloys also makes them desirable for use in armsets. For example, to perform a single data stroke, armset 15 may sweep through an arc of approximately 21.8 degrees during a data access time on the order of milliseconds. Such armset movement corresponds to movement of transducer 17 from an inner radial position over disks 12 to an outer radial position. This exerts a relatively large torque on the armset. Magnesium/beryllium alloys have been found strong enough to withstand these torques.

Furthermore, magnesium/beryllium armsets are relatively light. A magnesium alloy containing beryllium (or beryllium alloy containing magnesium), for instance, has a density generally within a range of about 1.74 g/cm$^3$ (5 wt. % beryllium) and 1.83 g/cm$^3$ (90 wt. % beryllium). Typically, pure magnesium has a density of about 1.73 g/cm$^3$ and pure beryllium has a density of about 1.85 g/cm$^3$. While magnesium/beryllium alloys have a density (and weight) slightly higher than that of magnesium, the slightly increased weight is more than offset by a greater stiffness and higher modulus of elasticity.

By minimizing weight of the armset, its inertia is also lessened. In accordance with one aspect of the present invention, magnesium/beryllium armset 15 has a moment of inertia generally within a range of 6×10$^{-6}$ kg×m$^2$ to 7×10$^{-6}$ kg×m$^2$ which is relatively low.

A lower inertia has a variety of advantages. It decreases disk access time. Access time is commonly known as the time required to physically position the transducers at a location on the disk (track) where the desired data resides and then settle on the track. The relatively low weight of magnesium/beryllium alloys permits armset 15 to move relatively quickly to reach the track at a selected current in the voice coil. It also permits the armset to stop relatively quickly once the track is reached.

Minimizing inertia also reduces the energy production required of those magnets that interact with the voice coil. Since a magnet with a lower energy product is typically less expensive, lowering the moment of inertia reduces costs.

Furthermore, a lower weight (and inertia) reduces the pow necessary to move the armset and improves power efficiency. Power efficiency is a concern, e.g., in battery-powered laptop computers, where power conservation is sought to improve battery life.

Although the present invention has been shown and described as achieving a reduction in inertia by varying the armset material and boring holes in the armset, it will be appreciated that other means (physical and material) may be used to reduce inertia, alternatively or concurrently with the present invention. For instance, inertia is minimized by use of a relatively thin armset profile, eliminating counterweights, and/or the need for steel buffer sleeves.

Magnesium/beryllium alloys are additionally beneficial because of their relatively high stiffness to mass ratio. The specific modulus (m) of a material is defined as the ratio between the modulus of elasticity (E) and density (ρ) or E/ρ. Typically, magnesium/beryllium alloys have a modulus of elasticity (E) generally within a range of 8.2 MPSI to 42 MPSI. The modulus of elasticity of elemental magnesium is typically about 6.4 MPSI, whereas that of elemental beryllium is about 44 MPSI.

The relatively high modulus of elasticity of magnesium/beryllium alloys is also beneficial. After armset 15 has arrived at a selected location on a magnetic track of the disk, it will have some residual vibration. Until this vibration has subsided substantially, data cannot be written to or read from the disks in a reliable fashion. The time it takes for the residual vibration to subside or dampen out so that data can be accessed is commonly known as the settling time. The relatively high modulus of elasticity of magnesium/beryllium alloys desirably reduces settling time and therefore disk access time.

More particularly, vibration of an armset has two components—amplitude and frequency. Resonant frequency (f) is proportional to $\sqrt{E/\rho}$ and amplitude is inversely proportional to E. High resonant frequency and low amplitude of vibration have been found to improve tracking tolerances. Magnesium/ beryllium armset 15 has a resonance frequency generally within a range 1.2 to 2.5 times higher than that of a conventional magnesium alloy armset having the same shape.

Figure 4:
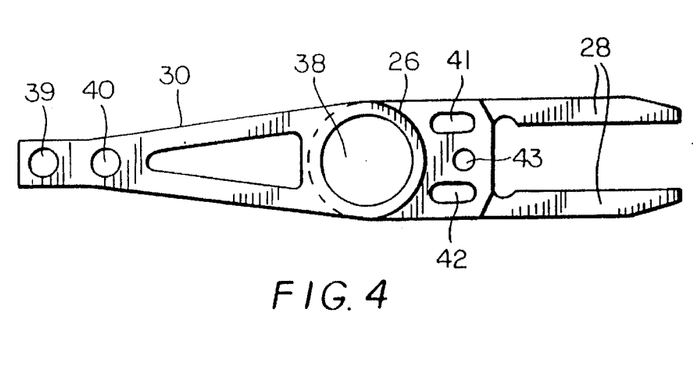
FIG. 4 is a side view of the armset of FIG. 3.
Figure 5:
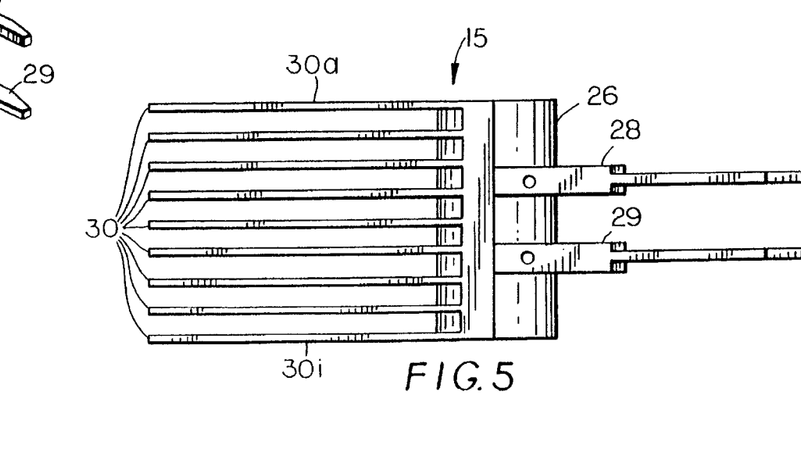
FIG. 5 is a plan view of the armset of FIG. 3.

As shown in FIG. 4, arms 30 are relatively thin, e.g., each being about 0.0285 inches thick. This is made possible by the relatively high stiffness to mass ratio or specific modulus of magnesium/beryllium alloys.

By increasing the weight % of beryllium in the magnesium/ beryllium alloy, the specific modulus and therefore resonant frequency of the alloy also increases. This is demonstrated generally in Tables I and II. At the same time, both the amplitude and duration of significant armset vibration are reduced. The density remains essentially at the desired low level of magnesium.

In accordance with one aspect of the present invention, as shown in FIGS. 1, 3, and 4, the magnesium/beryllium armset has a steel sleeve. A steel sleeve buffer is usually needed where there is a substantial thermal mismatch between the coefficient of thermal expansion (or CTE) of steel bearing assembly 19 and that of the armset. Magnesium/beryllium alloys have coefficients generally within a range of $7.2 \times 10^{-6}$ (in/in)/°F. (for 90 wt. % Be) to $13.6 \times 10^{-6}$ (in/in)°F. (for 5 wt. % Be). A mismatch occurs, for example, at beryllium compositions where the arm-set's coefficient is relatively far from about $8.3 \times 10^{-6}$ (in/in)°F. to about $9.6 \times 10^{-6}$ (in/in)°F., i.e., the coefficient of the steel bearing assembly.

It has been found that increasing the ratio (or weight %) of beryllium to magnesium in the alloy generally lowers the coefficient of thermal expansion, allowing it to get closer to that of standard spindle materials such as stainless steel. Where the coefficient of thermal expansion of the armset is the same or slightly different than that of the spindle, the steel sleeve may be unnecessary. As demonstrated by Tables I and II, alloys of about 65% beryllium have a coefficient of thermal expansion of about $9 \times 10^{-6}$ (in/in)°F. It will be appreciated by those skilled in the art that materials other than stainless steel may be used for this purpose and that differences in the coefficients of thermal expansion may be accommodated by means other than sleeves.

Moreover, while the addition of beryllium to the alloy slightly increases its density (and weight), the increase in weight is more than offset by improved strength and modulus of elasticity as well as the alloy's decreased coefficient of thermal expansion.

While the armset is shown and described as a one piece unit comprised entirely of a magnesium/beryllium (or beryllium/ magnesium) alloy, it will be appreciated by those skilled in the art that other materials and constructions may be used, giving consideration to the purpose for which the present invention is intended. For example, the armset may be constructed in whole or in part of at least magnesium (or a magnesium based alloy) containing beryllium. Alternatively or concurrently therewith, the armset may be constructed of a multilayer laminate, each layer being a sheet or washer of at least magnesium (or a magnesium based alloy) containing beryllium. The use of an aluminum (or aluminum based alloy) matrix containing an equiaxed morphology of beryllium, alternatively to or concurrently with the foregoing alloy, is also considered within the spirit and scope of the present invention.

Various modifications and alterations to the present invention may be appreciated based on a review of this disclosure. These changes and additions are intended to be within the scope and spirit of this invention as defined by the following claims.

What is claimed is:

1. A rotatable armset of an actuator having a bore which is rotatable about a spindle of a disk drive for positioning a transducer radially across a disk of the disk drive, wherein the armset is a laminate comprising multiple layers, each of a magnesium alloy mixture containing beryllium, the mixture comprising from about 1% to about 99% by weight beryllium with the balance a magnesium component, and being free of intermetallic $MgBe_{13}$ compounds.

2. The armset set forth in claim 1 wherein the armset of the actuator is a one piece assembly having a body portion, arms, and a set of brackets.

3. The armset set forth in claim 2 wherein a bearing assembly is interposed between the bore and the spindle.

4. The armset set forth in claim 3 wherein the bearing assembly comprises steel bearings.

5. The armset set forth in claim 2 wherein a voice coil is mounted to the brackets.

6. The armset set forth in claim 1 wherein the alloy mixture has a modulus of elasticity generally within a range of 8.2 MPSI to 42 MPSI.

7. The armset set forth in claim 1 wherein the alloy mixture has a coefficient of thermal expansion generally within a range of $6.8 \times 10^{-6}$ (in/in)/°F. to $14.1 \times 10^{-6}$ (in/in)/°F.

8. The armset set forth in claim 1 having a moment of inertia generally within a range of $6 \times 10^{-6}$ kg×m$^2$ to $7 \times 10^{-6}$ kg×m$^2$.

9. In a disk drive system, an actuator for movably positioning and supporting a transducer over a disk of the disk drive, wherein the actuator includes:

an armset comprising a magnesium alloy mixture containing beryllium, and having a bore which is pivotable about a spindle, the mixture comprising from about 1% to about 99% by weight beryllium with the balance a magnesium component, and being free of intermetallic $MgBe_{13}$ compounds;

a bearing assembly interposed between the armset and the spindle;

a flexible suspension coupled at one end to the armset;

a transducer coupled to an opposing end of the suspension;

a voice coil coupled to a set of brackets of the armset, wherein the voice coil and brackets are placed opposite the suspension and transducer such that a counter weight is not required to balance the armset relative to the bore.

10. The actuator set forth in claim 9 wherein the alloy mixture has a coefficient of thermal expansion generally within a range of $6.8 \times 10^{-6}$ (in/in)/°F. to $14.1 \times 10^{-6}$ (in/in)/°F.

11. The actuator set forth in claim 10 wherein the armset has a moment of inertia generally within a range of $6 \times 10^{-6}$ kg ×m$^2$ to $7 \times 10^{-6}$ kg×m$^2$.

12. A rotatable armset of an actuator having a sleeveless bore which is rotatable about a spindle of a disk drive for positioning a transducer radially across a disk of the disk drive, wherein the armset is a laminate comprising multiple layers, each of a magnesium alloy mixture containing beryllium, the mixture comprising from about 1% to about 99% by weight beryllium with the balance a magnesium component, and being free of intermetallic $MgBe_{13}$ compounds.

13. The armset set forth in claim 12 wherein the armset of the actuator is a one piece assembly having a body portion, arms, and a set of brackets.

14. The armset set forth in claim 13 wherein a bearing assembly is interposed between the bore and the spindle.

15. The armset set forth in claim 14 wherein the bearing assembly comprises steel bearings.

16. The armset set forth in claim 13 wherein a voice coil is mounted to the brackets.

17. The armset set forth in claim 12 wherein the alloy mixture has a modulus of elasticity generally within a range of 8.2 MPSI to 42 MPSI.

18. The armset set forth in claim 12 wherein the alloy mixture has a coefficient of thermal expansion generally within a range of $6.8 \times 10^{-6}$ (in/in)/°F. to $14.1 \times 10^{-6}$ (in/in)/°F.

19. The armset set forth in claim 12 having a moment of inertia generally within a range of $6 \times 10^{-6}$ kg×m$^2$ to $7 \times 10^{-6}$ kg×m$^2$.

20. In a disk drive system, an actuator for movably positioning and supporting a transducer over a disk of the disk drive system, wherein the actuator includes:

an armset comprising a magnesium alloy mixture containing beryllium, and having a sleeveless bore which is pivotable about a spindle, the mixture comprising from about 1% to about 99% by weight beryllium with the balance a magnesium component, and being free of intermetallic $MgBe_{13}$ compounds;

a bearing assembly interposed between the armset and the spindle;

a flexible suspension coupled at one end to the armset;

a transducer coupled to an opposing end of the suspension;

a voice coil coupled to a set of brackets of the armset, wherein the voice coil and brackets are placed opposite the suspension and transducer such that a counter weight is not required to balance the armset relative to the bore.

21. The actuator set forth in claim 20 wherein the alloy mixture has a coefficient of thermal expansion generally within a range of $6.8 \times 10^{-6}$ (in/in)/°F. to $14.1 \times 10^{-6}$ (in/in)/°F.

22. The actuator set forth in claim 20 wherein the armset has a moment of inertia generally within a range of $6 \times 10^{-6}$ kg×m$^2$ to $7 \times 10^{-6}$ kg×m$^2$.

23. A rotatable armset of an actuator having a bore for rotating about a spindle of a disk drive for positioning a transducer radially across a disk of the disk drive, wherein the armset is a one piece unit comprised of a magnesium alloy mixture containing beryllium, the mixture comprising from about 1% to about 99% by weight beryllium with the balance a magnesium component, and being free of intermetallic $MgBe_{13}$ compounds.

24. A rotatable armset of an actuator having a sleeveless bore for rotating about a spindle of a disk drive for positioning a transducer radially across a disk of the disk drive, wherein the armset is a one piece unit comprised of a magnesium alloy mixture containing beryllium, the mixture comprising from about 1% to about 99% by weight beryllium with the balance a magnesium component, and being free of intermetallic $MgBe_{13}$ compounds.

* * * * *

UNITED STATES PATENT AND TRADEMARK OFFICE
CERTIFICATE OF CORRECTION

PATENT NO. : 5,475,549  
DATED : December 12, 1995  
INVENTOR(S) : Marder et al.

Page 1 of 2

It is certified that error appears in the above-indentified patent and that said Letters Patent is hereby corrected as shown below: Title page, item [57], In the ABSTRACT, on line 2, after "," insert -- which --.

In column 1, on line 4, delete "," after "continuation".

In column 3, on line 2, replace ":" with -- s --.

In column 4, on line 32, replace "serve" with -- servo --.

In column 5, on line 48, replace "1993" with -- 1995 --.

In column 6, on line 39, replace "pow" with -- power --.

In column 7,
    on line 33, after "13.6 x $10^{-6}$ (in/in)" insert -- / --.

on line 35, replace "arm-set's" with -- armset's --.

on line 36, after "8.3 x $10^{-6}$ (in/in)" insert -- / --.

on line 36, after "9.6 x $10^{-6}$ (in/in)" insert -- / --.

on line 46, after "9 x $10^{-6}$ (in/in)" insert -- / --.

on line 59, delete the space between "/" and "magnesium".

UNITED STATES PATENT AND TRADEMARK OFFICE
CERTIFICATE OF CORRECTION

Page 2 of 2

PATENT NO. : 5,475,549
DATED : December 12, 1995
INVENTOR(S) : Marder, et. al.

It is certified that error appears in the above-identified patent and that said Letters Patent is hereby corrected as shown below:

In column 8, line 40, after "drive" insert -- system--.

Signed and Sealed this

Tenth Day of February, 1998

Attest:

BRUCE LEHMAN

Attesting Officer

Commissioner of Patents and Trademarks